US007309222B2

(12) United States Patent
Tippmann, Sr.

(10) Patent No.: US 7,309,222 B2

(45) Date of Patent: Dec. 18, 2007

(54) APPARATUS FOR WORKING PLIABLE MATERIAL

(75) Inventor: Dennis J. Tippmann, Sr., New Haven, IN (US)

(73) Assignee: Tippmann Industrial Products, Fort Wayne, IN (US)

( * ) Notice: Subject to any disclaimer, the term of this patent is extended or adjusted under 35 U.S.C. 154(b) by 159 days.

(21) Appl. No.: 11/223,401

(22) Filed: Sep. 9, 2005

(65) Prior Publication Data

US 2007/0056419 A1 Mar. 15, 2007

(51) Int. Cl.
*B29C 59/04* (2006.01)

(52) U.S. Cl. ...................... 425/181; 425/194; 425/363; 101/6

(58) Field of Classification Search ................ 425/181, 425/194, 363, 385; 101/6, 23
See application file for complete search history.

(56) References Cited

U.S. PATENT DOCUMENTS

| | | | | |
|---|---|---|---|---|
| 910,791 | A * | 1/1909 | Dahly | 425/181 |
| 4,641,575 | A * | 2/1987 | Cavagna | 101/23 |
| 5,615,592 | A | 4/1997 | Tippmann | |

* cited by examiner

*Primary Examiner*—James Mackey
(74) *Attorney, Agent, or Firm*—Barnes & Thornburg LLP

(57) ABSTRACT

Apparatus for working pliable material comprises a body, at least two rotatable shafts coupled to the body, an embossing assembly detachably coupled to an end of at least one of the shafts, and a cutting assembly and/or a creasing assembly being alternatively coupled to the end of the shaft in place of the embossing assembly. In one embodiment, the apparatus is powered by hand via a rotatable handle coupled to at least one of the shafts. The assembly may further comprise an adjustment wheel and an adjustment shaft for accomodating various material types.

40 Claims, 3 Drawing Sheets

APPARATUS FOR WORKING PLIABLE MATERIAL

TECHNICAL FIELD

The present invention relates to apparatus for working pliable material. More specifically, and in certain embodiments, the invention relates to a hand-operated apparatus for embossing, creasing, and/or cutting a pliable material, such as leather or plastic.

BACKGROUND AND SUMMARY

Machines for embossing pliable material are currently used. These machines include at least one embossing die having a pattern to emboss a material. The material is inserted into and fed through the machine, which applies pressure to the material through the embossing die. The material is embossed with the pattern of the embossing die.

The present invention allows a pliable material to not only be embossed, but also be cut and/or creased. In one illustrative embodiment, a hand-operated apparatus includes a body having at least two rotatable shafts coupled thereto. A handle is included to manually operate the machine causing rotation of the shafts. The apparatus includes an embossing assembly, which can be selectively coupled to the rotatable shafts. The embossing assembly includes an embossing die and a roller. As the shafts are rotated, the embossing die and roller also rotate. A material is fed between the rotating embossing die and roller to be embossed.

In another illustrative embodiment, the apparatus can be selectively coupled to a cutting assembly as an alternative to the embossing assembly. The cutting assembly includes a cutting wheel and cutting wheel nut, which can each be selectively coupled to a respective shaft. The nut can include a groove formed therein to serve as a guide for the cutting wheel. As the shafts rotate, the cutting wheel and nut also rotate. Material can be fed between the cutting wheel and nut for cutting.

In another illustrative embodiment, the apparatus can be selectively coupled to a creasing assembly as an alternative to both the embossing and cutting assemblies. The creasing assembly includes first and second creasing wheels, which are complimentarily shaped. Each creasing wheel is selectively coupled to a respective shaft. The creasing wheels rotate as the shafts are rotated. Material can be fed between the creasing wheels and creased by the creasing wheels.

In another illustrative embodiment, the apparatus includes a material guide. The material guide allows material to be appropriately guided through the apparatus during embossing, cutting, or creasing of the material. The apparatus can also include an adjustment assembly, which allows the distance between the shafts to be adjusted. Adjustment of the distance between the shafts determines the depth at which material is embossed, cut, and creased and allows materials of various thicknesses to be fed therethrough.

Additional aspects and features will become apparent to those skilled in the art upon consideration of the following detailed description of the illustrated embodiments exemplifying the best mode of carrying out the invention as presently perceived, and the claims which follow the detailed description.

BRIEF DESCRIPTION OF DRAWINGS

The present invention will be described hereafter with reference to the attached drawings which are given as non-limiting examples only, in which.

Corresponding reference characters indicate corresponding parts throughout the several views. The exemplification set out herein illustrates embodiments of the apparatus, and such exemplification is not to be construed as limiting the scope of the invention in any manner.

DETAILED DESCRIPTION OF THE DRAWINGS

Figure 1:
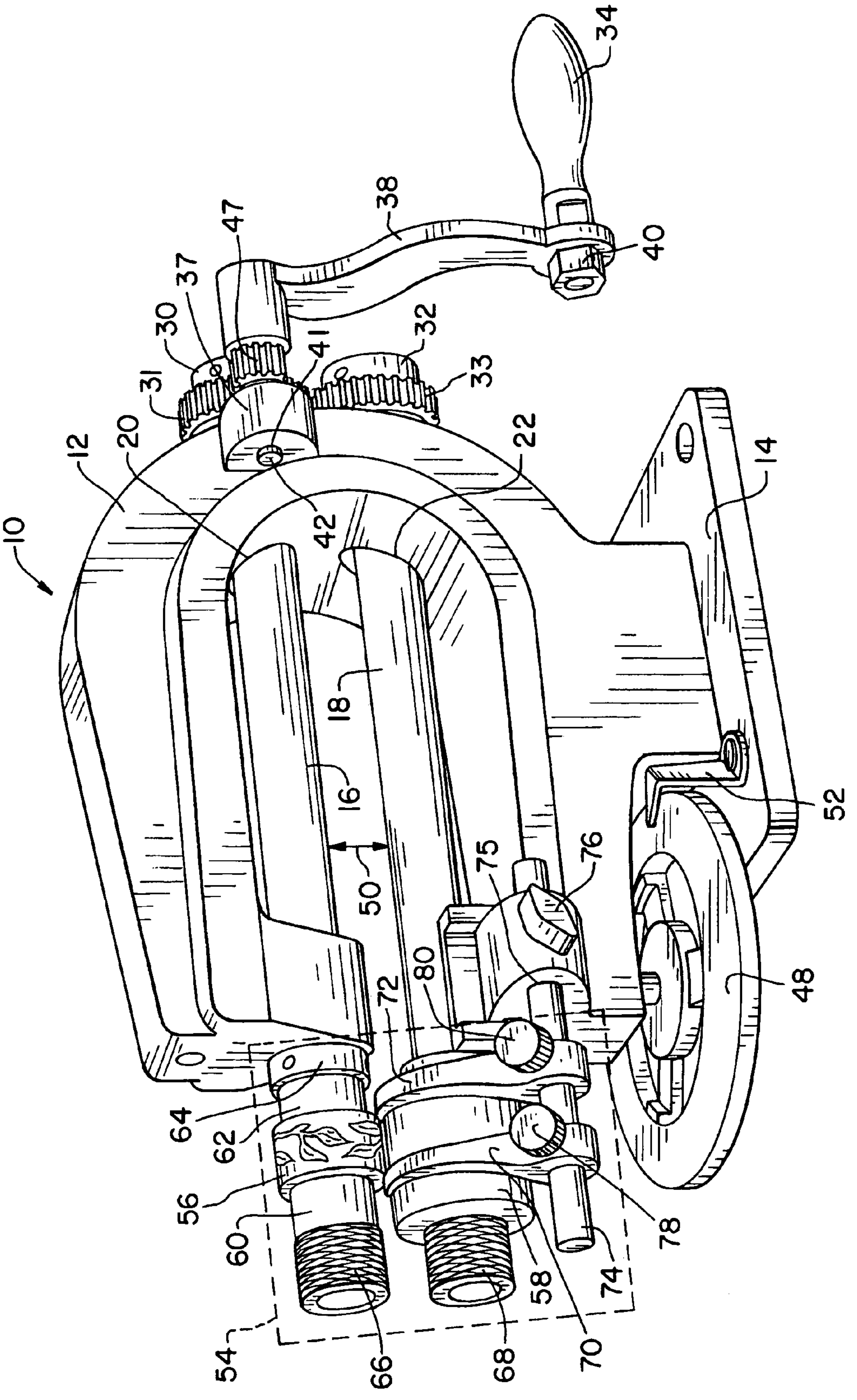
FIG. 1 is perspective view of an illustrative embodiment of a hand-operated apparatus configured as an embosser.

FIG. 1 shows a perspective view of an illustrative embodiment of apparatus 10 configured for embossing a pliable material. Apparatus 10 includes body 12 coupled to base 14. Apparatus 10 also includes shafts 16, 18, which are each disposed through openings 20, 22, respectively, of body 12. Shaft 16 is also disposed through opening 24 of body 12 and shaft 18 is disposed on pressure block 26 shown in detail in FIG. 2.

Shafts 16, 18 are each coupled to a gear wheel 30, 32, respectively. Gear wheels 30, 32 are engaged with one another through a respective set of teeth 31, 33. Gear wheels 30, 32 are rotatable through manual actuation of handle 34. Handle 34 is disposed through opening 36 of handle arm 38 and coupled thereto through nut 40, which is screwed onto threaded portion 35 of handle 34, shown in FIG. 2. Handle arm 38 is coupled to body 12 through pin 42, which is disposed through opening 41 of handle mount 37. Gear wheel 46 is disposed between handle arm 38 and handle mount 37. Gear wheel 46 engages teeth set 31 with teeth set 47 through rotation of handle arm 38 such that both gear wheels 30, 32 rotate thereby rotating shafts 16, 18.

Gap 50 between shafts 16, 18 is adjustable through adjustment wheel 48. Adjustment wheel 48 can be rotated in either a clockwise or counter-clockwise direction, with the rotation of adjustment wheel 48 varying the size of gap 50 between shafts 16, 18. Pointer 52 allows a user of apparatus 10 to gauge the setting of adjustment wheel 48. Other components used to vary gap 50 are shown in detail in FIG. 2.

FIG. 1 illustratively shows body 12 to include embossing assembly 54. Embossing assembly 54 includes components used to emboss a material fed between shafts 16, 18. As shown in FIG. 1, embossing roller 56 is cylindrically shaped and is disposed on shaft 16. Embossing roller 56 typically includes a die pattern located on its exterior surface as illustratively shown in FIG. 1. Roller 58 is disposed on shaft 18 opposite embossing roller 56. In this illustrative embodiment, embossing roll spacers 60, 62 are disposed on shaft 16 with embossing roller 56 located therebetween. Locking collar 64 and knurled hand nut 66 are disposed on shaft 16 to secure embossing roller 56 along shaft 16. Knurled hand nut 68 is coupled to shaft 18 to secure roller 58 on shaft 18. Roller 58 provides support in a direction opposite that provided by embossing roller 56 during embossment to create enough force on a material fed through to impress the die pattern thereon.

Also shown in FIG. 1, are material guides 70, 72, which are used to properly align material to be fed between shafts 16, 18. In this illustrative embodiment, material guides 70,

72 are disposed on shaft 74, which is disposed through opening 75 of body 12 and secured therein by adjustable shaft knob 76 and throughout shaft 77. Shaft 77 is coupled to adjustable shaft knob 76 and disposed through opening 81 of body 12 to engage shaft 74 and secure it to body 12. Material guides 70, 72 each include guide knobs 78, 80, respectively, to slideably adjust material guides 70, 72 along shaft 74 and tighten them thereto.

Figure 2:
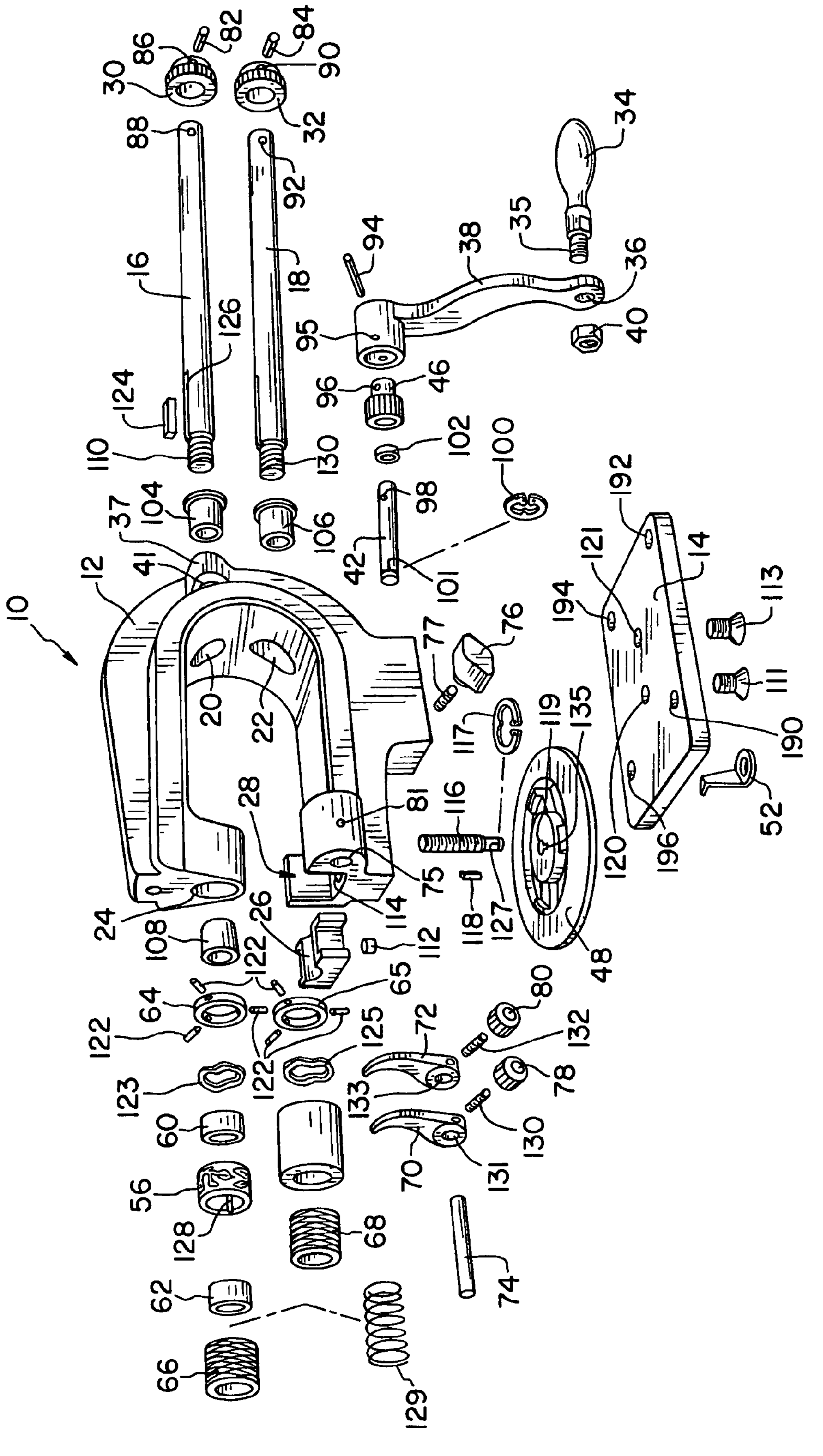
FIG. 2 is an exploded view of the apparatus shown in FIG. 1.

FIG. 2 shows an exploded perspective view of apparatus 10. This view illustratively shows several components that are hidden in FIG. 1. Body 12 is coupled to base 14 through threaded fasteners 111, 113. Threaded fasteners 111, 113 are disposed through openings 120, 121 in base 14. Body 12 includes openings (not shown) to receive fasteners 111, 113, to couple base 14 to body 12. Base 14 also includes mounting holes 190-196 to allow fasteners disposed therethrough to mount base 14 to a supporting structure such as a work bench. Mounting hole 192 is also used to secure pointer 52 to base 14 by a fastener disposed therethrough. FIG. 2 illustratively shows roll pins 82, 84, which couple shafts 16, 18, respectfully, to gear wheels 30, 32. Roll pin 82 is disposed through aligned openings 86, 88 of gear wheel 30 and shaft 16, respectively. Roll pin 84 is similarly disposed through aligned openings 90, 92 of gear wheel 32 and shaft 18, respectively. Roll pin 94 is disposed through opening 95 of handle arm 38, opening 96 of gear wheel 46, and opening 98 of shaft 42. Clip 100 is disposed within groove of pin 42 to secure pin 42 within opening 41. Pin 42 is also disposed through shaft spacer 102, gear wheel 46, and within handle arm 38. Shaft spacer 102 separates handle mount 37 and gear wheel 46. Fittings 104, 106 are disposed in openings 20, 22, respectively.

Bushing 108 is disposed in opening 24 of body 12. Shaft 16 is disposed through opening 20 and opening 24 so that its threaded portion 110 is disposed therethrough. Pressure block 26 is disposed within recess 28 of body 12 with spacer 112 being disposed within opening 114 and between body 12 and pressure block 26. Shaft 18 is disposed through opening 22 and then disposed on pressure block 26. As previously stated, gap 50 can be varied through rotation of adjustment wheel 48. Shaft 116 is inserted into opening 119 and is coupled to adjustment shaft 116 through key 118, which is inserted into groove 135 of adjustment wheel 48 and a similar groove (not shown) of adjustment shaft 116. Key 118 communicates the rotation of adjustment wheel 48 to shaft 116. Clip 117 is disposed within groove 127 to secure shaft 116 to adjustment wheel 48 during use. Shaft 116 is disposed through opening 114 so that shaft 116 comes into contact with spacer 112. Opening 114 is threaded to engage shaft 116, which is also illustratively shown to be threaded. As adjustment wheel 48 is rotated, adjustment shaft 116 is disposed further into opening 114 towards pressure block 26 or away from. Spacer 112 is positioned between pressure block 26 and shaft 116. Spacer 112 engages pressure block 26 as shaft 116 is disposed further into opening 114. The position of shaft 116 within opening 114 determines the displacement of pressure block 26 within recess 28. The displacement of pressure block 26 determines the width of gap 50. In this illustrative embodiment, adjustment wheel 48 is used to vary the distance between embossing roller 56 and roller 58 to accommodate materials of various thicknesses and to determine the depth of embossment.

Each shaft 16, 18 is disposed through a locking collar 64, 65, respectively. Locking collars 64, 65 are secured to shafts 16, 18 through threaded fasteners 122, which prevent shafts 16, 18 from being disposed back through body 12. With shafts 16, 18 disposed through body 12 and secured into place, embossing assembly 54 can be disposed thereon. Embossing assembly 54 includes washers 123, 125, which are disposed on shafts 16, 18, respectively. As shown in FIG. 2, embossing spacer 62 is disposed on shaft 16, followed by embossing roller 56. Embossing roller 56 includes groove 128 disposed within the inner-surface thereof, which is formed to receive key 124. Shaft 16 includes groove 126, which is also formed to receive key 124 so that when embossing roller 56 is disposed on shaft 16, key 124 is disposed within grooves 126, 128, thereby preventing embossing roller 56 from rotating with respect to shaft 16. Embossing roller 56 is disposed between embossing spacers 60, 62 on shaft 16. The inner surface of knurled hand nut 66 is threaded to interact with threaded portion 110 of shaft 16 so that knurled hand nut 66 can be screwed onto threaded portion 110 securing the components of embossing assembly 54 onto shaft 16.

Roller 58 is disposed on shaft 18 opposite embossing roller 56. Shaft 18 includes threaded portion 130 which interacts with interior threads of knurled hand nut 68 so that knurled hand nut 68 can be secured thereon. Embossing assembly 54 can implement embossing rollers of various widths, which are properly positioned by spring 129. Spring 129 is disposed on shaft 16 between an embossing roller and knurled hand nut 66 to keep the embossing roller longitudinally fixed along shaft 16.

Shaft 74 is disposed through opening 75 of body 12 and openings 131, 133 of material guides 70, 72, respectively. Material guides 70, 72 each use a threaded fastener 130, 132, respectively. Threaded fasteners 130, 132 each engage a respective guide knob 78, 80 for sliding material guides 70, 72 along shaft 74 and adjusting threaded fasteners 130, 132 to engage shaft 74. When shaft 74 is disposed within body 12, adjustment knob 76 can be used to secure shaft 74 within opening 75. Shaft 77 is inserted into knob 76 and disposed through opening 81 of body 12 to engage shaft 74, thereby securing shaft 74 into place.

During operation, material guides 70, 72 can be slidably adjusted along shaft 74 and secured in place to properly align any material fed through embossing assembly 54. Once material guides 70, 72 are in place, gap 50 can be adjusted through adjustment wheel 48 to set the distance between roller 58 and embossing roller 56 for receiving a material of a certain thickness or to emboss at a particular depth. Once embossing assembly 54 is adjusted accordingly, handle 34 can be actuated to cause rotation of gear wheels 30, 32, which in turn causes rotation of embossing roller 56 and roller 58 allowing embossment of a material fed therethrough.

Figure 3:
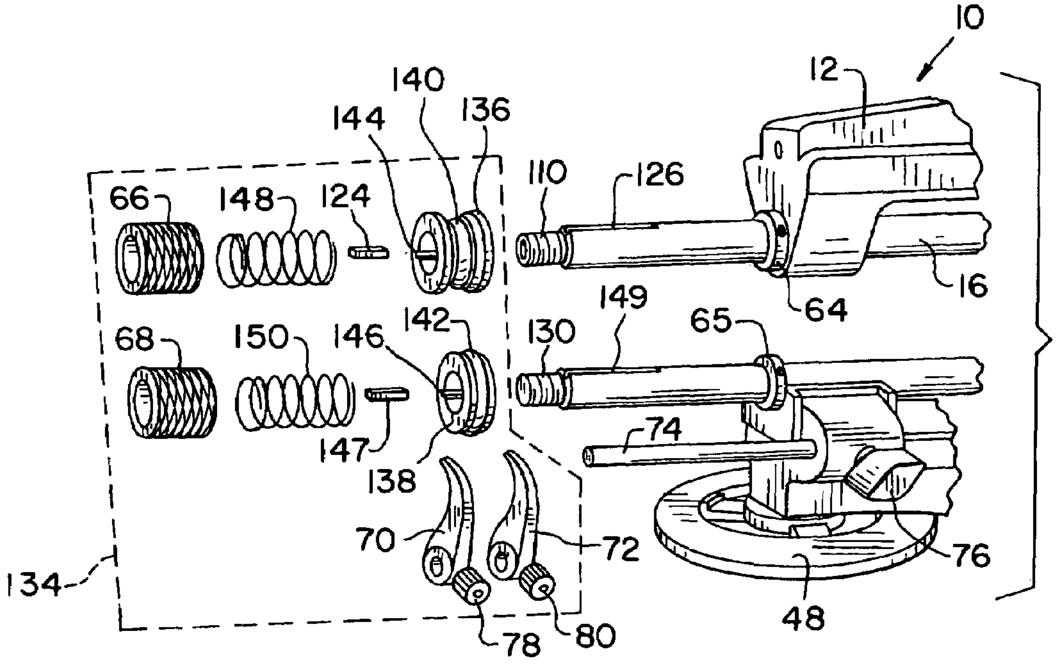
FIG. 3 is an exploded partial view of an illustrative embodiment of the apparatus of FIG. 1 configured as a creaser.

FIG. 3 shows a partially exploded perspective view of apparatus 10 shown in FIG. 1 configured with creasing assembly 134 used to crease pliable materials. As shown in FIG. 3, creasing assembly 134 can be disposed on shafts 16, 18 of apparatus 10. Creasing assembly includes creasing wheels 136, 138. Surfaces 140, 142 of creasing wheels 136, 138, respectively, are complimentarily formed to function together to crease a material fed therethrough. In this illustrative embodiment, creasing wheels 136, 138 are disposed simultaneously on shafts 16, 18, respectively, and aligned with one another due to the complimentary surface shapes of surfaces 140, 142. Similar to embossing roller 56, each creasing wheel 136, 138 includes a groove 144, 146 disposed within the inner surfaces thereof. Grooves 144, 146 are formed to each receive a key 124, 147, respectively. Similar to shaft 16, shaft 18 includes groove 127 which is formed to receive key 147. Keys 124, 147 are received by grooves 126, 149 to secure creasing wheels 136, 138 from rotation with respect to shafts 16, 18 during use.

Knurled hand nuts 66, 68 are disposed onto threaded portions 110, 130 of shafts 16, 18, as similarly shown in FIG. 2. Springs 148, 150 are disposed onto shafts 16, 18, respectively, between a respective knurled hand nut 66, 68 and creasing wheel 136, 138. Springs 148, 150 bias creasing wheels 136, 138 towards body 12 to longitudinally secure creasing wheels 136, 138 along shafts 16, 18. Material guides at 70, 72 can be used to align material fed between creasing wheels 136, 138, as described regarding embossing assembly 54. Handle 34 is actuated to rotate creasing wheels 136, 138 as material is fed therethrough, which is creased according to the surface shapes of surfaces 140, 142.

Figure 4:
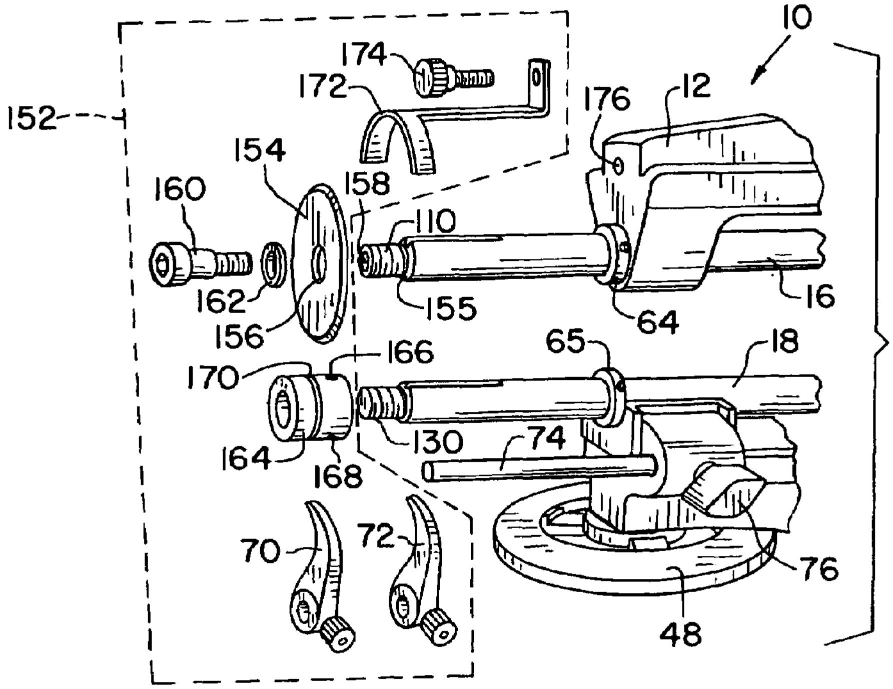
FIG. 4 is an exploded partial view of an illustrative embodiment of the apparatus of FIG. 1 configured as a cutter.

FIG. 4 shows a partially exploded view of apparatus 10 configured for cutting a pliable material. FIG. 4 shows cutting assembly 152, which includes cutting wheel 154. The diameter of opening 156 of cutting wheel 154 is dimensioned to receive threaded portion 110 of shaft 16, and engage ridge 155 of shaft 16 to prevent the cutting wheel from sliding further down shaft 16. Cutting wheel 154 is disposed on threaded portion 110 followed by washer 162 and then secured thereto by shoulder bolt 160. Shaft 16 includes opening 158, which is internally threaded to receive shoulder bolt 160. Threaded portion 130 of shaft 18 receives cutting wheel nut 164. Cutting wheel nut 164 is internally threaded to engage threaded portion 130 of shaft 118. Cutting wheel nut 164 also includes locking screws (not shown) disposed within openings 166, 168 to engage threaded portion 130 to secure cutting wheel nut 164 with respect to shaft 18. Cutting wheel nut 164 also includes groove 170, which can be aligned with cutting wheel 154. Adjustment wheel 48 can be used to vary the depth at which cutting wheel 54 is disposed within groove 170.

Cutting assembly 152 also includes safety guard 172 which is positioned to partially surround the cutting surface of cutting wheel 154. Safety guard 172 is fastened to body 12 with safety blade knob 174. Safety blade knob 174 is illustratively shown as a threaded fastener and disposed through opening 176 of body 12. Opening 176 is threaded to engage the threads of safety blade knob 174. Once the components of cutting assembly 152 are in place, material guides 70, 72 can be positioned along shaft 74 to properly align material to be fed through cutting assembly 152. Handle 34 is actuated to rotate both cutting wheel 154 and cutting wheel nut 164 as material is fed therethrough to be cut. Adjustment wheel 48 can be used to vary the distance in which cutting wheel 154 is disposed within groove 170 to accommodate various material thicknesses or vary the depth of cutting.

The embodiments shown in FIGS. 1 through 4 include handle 34 which is manually actuated to rotate shafts 16, 18. Non-manual means could also be used to rotate shafts 16, 18. Such means could be powered by electric, pneumatic or hydraulic devices. For instance, an electric motor could be coupled to shafts 16, 18 through a set of gears with the electric motor selectively delivering the torque necessary to rotate shafts 16, 18. Various controllers could be implemented to selectively control the electric motor, such as a foot pedal, for example.

Although the invention has been described with reference to particular means, materials and embodiments, from the foregoing description, one skilled in the art can easily ascertain the essential characteristics of the invention and various changes and modifications may be made to adapt the various uses and characteristics without departing from the spirit and scope of the present invention as set forth in the following claims.

What is claimed is:

1. Apparatus for working pliable material, said apparatus comprising:

a) a body;

b) at least two rotatable shafts, said shafts coupled to said body;

c) an embossing assembly selectively and detachably coupled to an end of at least one of said shafts; and d) at least one of a cutting assembly and a creasing assembly, said at least one assembly being alternatively coupled to said end of said at least one of said shafts in place of said embossing assembly.

2. The apparatus of claim 1, wherein at least one of said shafts is disposed through said body.

3. The apparatus of claim 1, further comprising a rotatable handle, said handle coupled to at least one of said shafts.

4. The apparatus of claim 3, wherein said shafts are coupled to one another, whereby said shafts rotate when said handle is rotated.

5. The apparatus of claim 1 further comprising an adjustment assembly coupled to said body and operable to adjust at least one of said embossing, cutting and creasing assemblies, said adjustment assembly comprising:

a) an adjustment wheel; and b) an adjustment shaft;

c) wherein, said adjustment shaft is coupled to said adjustment wheel and wherein said adjustment shaft and adjustment wheel are rotatable.

6. The apparatus of claim 5, wherein rotation of said adjustment wheel varies the distance of a gap between the rotatable shafts.

7. The apparatus of claim 1, wherein said embossing assembly comprises:

a) a pattern die roller;

b) a support roller; and c) a material guide assembly.

8. The apparatus of claim 7, wherein said at least two rotatable shafts comprise a first shaft and a second shaft, and wherein said pattern die roller is coupled to said first shaft and wherein said support roller is coupled to said second shaft, whereby said pattern die roller and support roller oppose one another.

9. The apparatus of claim 8, wherein said pattern die roller and said support roller rotate when said first and second shafts rotate, whereby material fed through said embossing assembly is embossed.

10. The apparatus of claim 9, further comprising an adjustment apparatus, wherein said adjustment apparatus selectively adjusts a gap between said pattern die roller and said support roller.

11. The apparatus of claim 1, further comprising non-manual means for rotating said shafts.

12. The apparatus of claim 7, wherein said material guide assembly comprises:

a) a guide shaft, said guide shaft disposed within said body and extending outwardly therefrom; and b) at least one guide member;

c) wherein, said at least one guide member is slidably adjustable along said guide shaft;

d) whereby, said at least one guide member is selectively adjusted to guide materials of various widths through said embossing assembly.

13. The apparatus of claim 1, wherein said cutting assembly comprises:

a) a cutting wheel;

b) a cutting wheel nut; and c) a material guide assembly.

14. The apparatus of claim 13, wherein said at least two rotatable shafts comprise a first shaft and a second shaft, and wherein said cutting wheel is coupled to said first shaft and wherein said cutting wheel nut is coupled to said second shaft, whereby said cutting wheel and cutting wheel nut oppose one another.

15. The apparatus of claim 14, wherein said cutting wheel nut comprises a guide groove, said guide groove being alignable with said cutting wheel.

16. The apparatus of claim 14, wherein said cutting wheel and cutting wheel nut are rotated when said first and second shafts rotate, whereby material fed through said cutting assembly is cut.

17. The apparatus of claim 16, further comprising an adjustment apparatus coupled to said body, wherein said adjustment apparatus selectively adjusts the depth at which a material is cut that is fed through said cutting assembly.

18. The apparatus of claim 16, further comprising an adjustment apparatus, wherein said adjustment apparatus selectively adjusts the distance between said cutting wheel and said cutting wheel nut to cut materials of varying thickness.

19. The apparatus of claim 13, wherein said material guide assembly comprises:

a) a guide shaft, said guide shaft disposed within said body and extending outwardly therefrom; and b) at least one guide member;

c) wherein, said at least one guide member is slidably adjustable along said guide shaft;

d) whereby, said at least one guide member is selectively adjusted to guide materials of various widths through said cutting assembly.

20. The apparatus of claim 1, wherein said creasing assembly comprises:

a) first and second creasing wheels, said first and second creasing wheels having complimentary surfaces; and b) a material guide assembly.

21. The apparatus of claim 20, wherein said at least two rotatable shafts comprise a first shaft and a second shaft, and wherein said first creasing wheel is coupled to said first shaft and said second creasing wheel is coupled to said second shaft, wherein said first and second creasing wheels oppose one another.

22. The apparatus of claim 21, wherein said first and second creasing wheels rotate when said first and second shafts rotate, whereby material fed through the creasing assembly is creased.

23. The apparatus of claim 20, further comprising an adjustment apparatus coupled to said body, wherein said adjustment apparatus selectively adjusts the depth at which a material is creased that is fed through said creasing assembly.

24. The apparatus of claim 20, further comprising an adjustment apparatus, wherein said adjustment apparatus selectively adjusts the distance between said first and second creasing wheels to crease materials of varying thickness.

25. The apparatus of claim 20, wherein said material guide assembly comprises:

a) a guide shaft, said guide shaft disposed within said body and extending outwardly therefrom, and b) at least one guide member;

c) wherein, said at least one guide member is slidably adjustable along said guide shaft;

d) whereby, said at least one guide member is selectively adjusted to guide materials of various widths through said creasing assembly.

26. Apparatus for working pliable material, said apparatus comprising:

a) a body;

b) at least two rotatable shafts, said shafts coupled to said body;

c) an embossing assembly, a cutting assembly and a creasing assembly, each assembly alternatively, selectively and detachably coupled to an end of at least one of said shafts.

27. The apparatus of claim 26, further comprising a rotatable handle, said handle coupled to at least one of said shafts.

28. The apparatus of claim 27, wherein said shafts are coupled to one another whereby said shafts rotate when said handle is rotated.

29. The apparatus of claim 26, further comprising non-manual means for rotating said shafts.

30. The apparatus of claim 26, further comprising an adjustment assembly coupled to said body and operable to adjust at least one of said embossing, cutting and creasing assemblies, said adjustment assembly comprising:

a) an adjustment wheel; and b) an adjustment shaft, c) wherein, said adjustment shaft is coupled to said adjustment wheel and said adjustment shaft and adjustment wheel are rotatable.

31. The apparatus of claim 30, wherein rotation of said adjustment wheel varies the distance of a gap between a first and second shaft.

32. The apparatus of claim 26, wherein said embossing assembly comprises:

a) a pattern die roller;

b) a support roller; and c) a material guide assembly.

33. The apparatus of claim 32, wherein said at least two rotatable shafts comprise a first shaft and a second shaft, and wherein said pattern die roller is coupled to said first shaft and wherein said support roller is coupled to said second shaft, whereby said pattern roller die and support roller oppose one another.

34. The apparatus of claim 33, wherein said pattern die roller and said support roller rotate when said shafts rotate, whereby material fed through said embossing assembly is embossed.

35. The apparatus of claim 26, wherein said cutting assembly comprises:

a) a cutting wheel b) a cutting wheel nut; and c) a material guide assembly.

36. The apparatus of claim 35, wherein said at least two rotatable shafts comprise a first shaft and a second shaft, and wherein said cutting wheel is coupled to said first shaft and wherein said cutting wheel nut is coupled to said second shaft, whereby said cutting wheel and cutting wheel nut oppose one another.

37. The apparatus of claim 36, wherein said cutting wheel and cutting wheel nut are rotated when said first and second shafts rotate, whereby material fed through said cutting assembly is cut.

38. The apparatus of claim 26, wherein said creasing assembly comprises:

a) first and second creasing wheels, said first and second creasing wheels having complimentary surfaces; and b) a material guide assembly.

39. The apparatus of claim 38, wherein said at least two rotatable shafts comprise a first shaft and a second shaft, and wherein said first creasing wheel is coupled to said first shaft and second creasing wheel is coupled to said second shaft, wherein said first and second creasing wheels oppose one another.

40. The apparatus of claim 39, wherein said first and second creasing wheels rotate when said first and second shafts rotate, whereby material fed through the creasing assembly is creased.

* * * * *